United States Patent [19]

Belart et al.

[11] Patent Number: 4,783,125

[45] Date of Patent: Nov. 8, 1988

[54] SLIP-CONTROLLED HYDRAULIC BRAKE SYSTEM

[75] Inventors: Juan Belart, Moerfelden-Walldorf; Jochen Burgdorf, Offenbach-Rumpenheim; Wolfram Seibert, Pfungstadt; Norbert Ocvirk, Offenbach, all of Fed. Rep. of Germany

[73] Assignee: Alfred Teves GmbH, Frankfurt Am Main, Fed. Rep. of Germany

[21] Appl. No.: 59,957

[22] Filed: Jun. 9, 1987

[30] Foreign Application Priority Data

Jun. 10, 1986 [DE] Fed. Rep. of Germany ....... 3619487

[51] Int. Cl.$^4$ ............................................. B60T 8/94
[52] U.S. Cl. ...................................... 303/92; 303/119
[58] Field of Search ..................... 188/181 A, 181 R; 303/92, 110, 113, 114, 116, 119

[56] References Cited

U.S. PATENT DOCUMENTS 4,492,413 1/1985 Belart et al. ........................ 303/92
4,509,802 4/1985 Solleder et al. .................... 303/110

FOREIGN PATENT DOCUMENTS 3237959 5/1983 Fed. Rep. of Germany .
3345159 6/1985 Fed. Rep. of Germany .
3347618 7/1985 Fed. Rep. of Germany .
3420686 12/1985 Fed. Rep. of Germany .
3418044 4/1986 Fed. Rep. of Germany .
3511579 10/1986 Fed. Rep. of Germany .
2169370 12/1984 United Kingdom .

Primary Examiner—Duane A. Reger
Attorney, Agent, or Firm—James B. Raden

[57] ABSTRACT

A slip-controlled hydraulic brake system which comprises a master cylinder and an auxiliary-pressure supply system is equipped with a travel-responsive switch actuatable by a piston of the master cylinder. An auxiliary-pressure supply system is used for the purpose of pressure delivery during the stop control phase and to safeguard a reserve volume or reserve stroke in the pressure chambers of the master cylinder. To this end, the auxiliary-pressure supply system will be activated and, if need be, check valves will be changed over on attainment of a limit value by virtue of the travel-responsive switch.

6 Claims, 1 Drawing Sheet

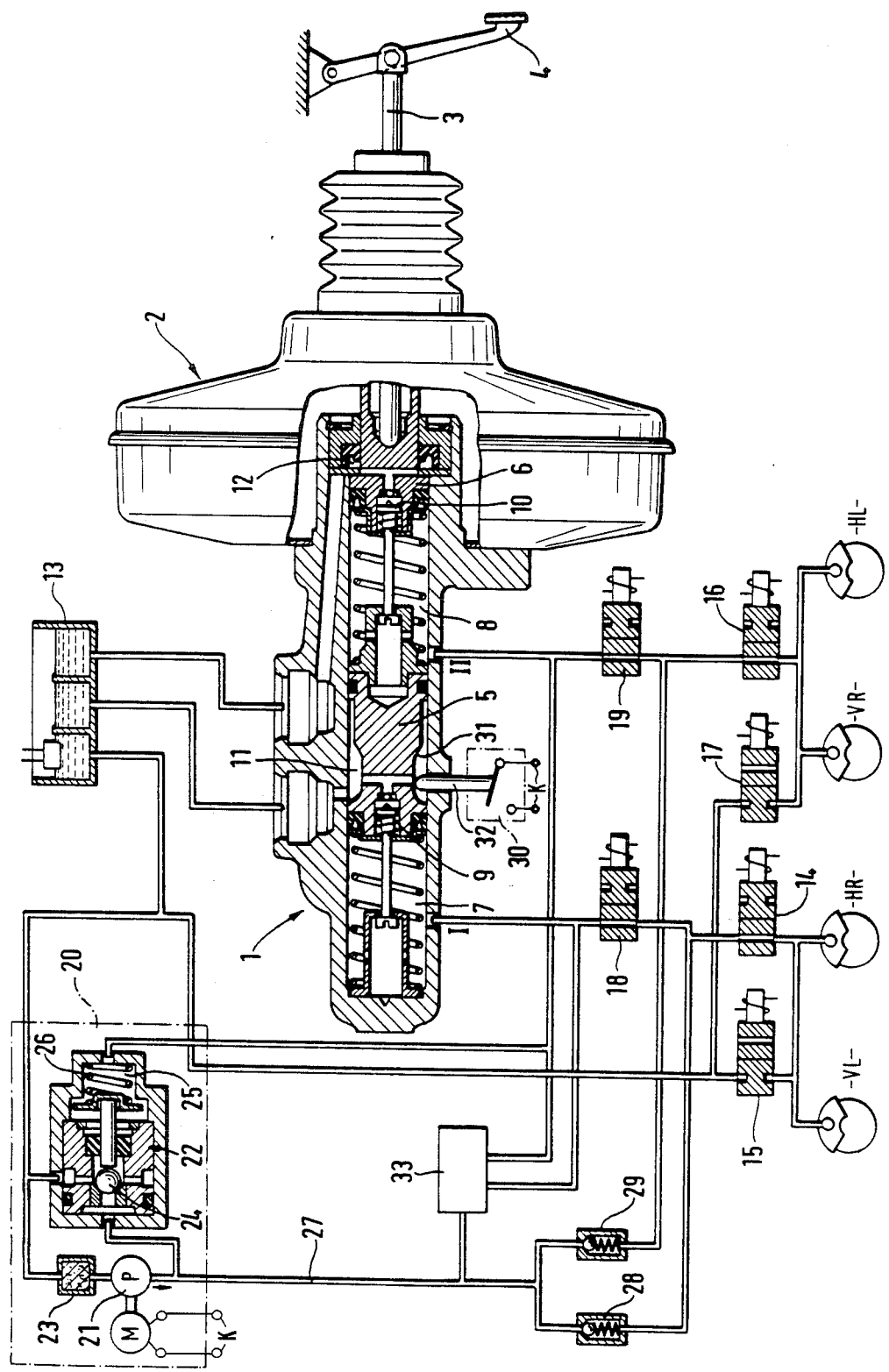

SLIP-CONTROLLED HYDRAULIC BRAKE SYSTEM

The present invention relates to a slip-controlled hydraulic brake system particularly useful in automotive vehicles. Such a system comprises a master cylinder having a pressure chamber or chambers to which the wheel brakes are connected through braking pressure control valves. Pressure fluid from an auxiliary-pressure supply system can be introduced during control action directly or via a control valve, for instance via a hydraulic braking pressure booster connected upstream of the master cylinder.

Anti-lock brake systems are known and on the market already. These systems comprise a hydraulic braking pressure generator, namely a master cylinder with a brake power booster connected upstream thereof, an auxiliary-pressure supply system, electromagnetically actuatable braking pressure control valves and electronic circuits which process wheel sensor signals representative of the wheel rotational behavior and which generate the braking-pressure control signals (German published patent application No. 30 40 561 corresponding to U.S. Pat. No. 4,415,210 issued Nov. 15, 1983). For the purpose of braking pressure reduction during an anti-lock control action, pressure fluid is discharged in these systems from the wheel brakes to a compensating reservoir by means of the braking-pressure control valves. To compensate for the discharge quantity of pressure fluid, during the control action, pressure fluid is delivered through another solenoid valve into the pressure chambers in the interior of the master cylinder, the said pressure fluid emanating from a source containing auxiliary pressure that is controlled proportional to pedal force. For that reason this type of pressure delivery is referred to as dynamic fluid supply.

When dimensioning the master cylinder in like and similar systems, a reserve volume of pressure fluid in the pressure chamber or the pressure chambers and, respectively, a reserve stroke of the pistons in the master cylinder must be taken into account to ensure that a sufficient amount of pressure fluid is preserved for braking (without slip control) the vehicle even under unfavorable conditions such as the sudden or insidious failure of the auxiliary-pressure supply system. This entails considerable expenditure, since the most unfavorable instance must be made the basis in consideration of the mode of effect of the associated monitoring device.

SUMMARY OF THE INVENTION

It is an object of the present invention to eliminate the above noted shortcoming and to safeguard that a sufficient reserve volume or reserve stroke is available at any time by use of a comparatively simple measure.

This object can be achieved in a brake system of the type initially referred to in a relatively simple fashion in that, during braking actions without slip control, a reserve volume of pressure fluid can be preserved in at least one of the pressure chambers of the master cylinder by introducing pressure fluid out of the auxiliary-pressure supply system. The introduction of the pressure fluid commences in the event the quantity of pressure fluid drops below a predetermined limit value.

This invention and mode of operation can be used for master cylinders with a vacuum booster and also for those with a hydraulic booster.

Consequently, according to this invention, the dynamic fluid delivery into the master-cylinder pressure chambers is utilized not only for compensation of the pressure fluid which is discharged into the reservoir during slip control, but likewise for safeguarding, i.e. preserving a sufficient reserve volume for braking without slip control, for example in the presence of a great brake deceleration on a dry non-skid road surface. In the event of insidious leakage and other defects, the utilization of the auxiliary-pressure source also limits the piston travel and maintains the reserve volume, respectively.

According to preferred embodiments of the invention, the reserve volume is preserved by monitoring the piston travel in the master cylinder, by monitoring the advance movement of the push rod which couples the brake pedal to the master cylinder or to a booster connected upstream thereof, or by monitoring the booster stroke. Pressure fluid from the auxiliary-pressure supply system is introduced upon attainment of a predefined limit value of piston travel, push rod travel or booster stroke.

In another embodiment of this invention the master cylinder is designed as a tandem master cylinder, and the advance movement of the push rod piston and/or the floating piston can be monitored.

The preservation of the reserve volume according to the present invention is conveniently controlled by travel-responsive switches which-when the predetermined limit value for travel and stroke, respectively, is reached or remained under - switch on the auxiliary-pressure supply system and/or bring about the introduction of pressure fluid into the pressure chamber or chambers. It is convenient in some cases to provide a travel-responsive switch which is actuated by one of the pistons of the master cylinder after a predefined advance movement has been exceeded, the said switch switching on the auxiliary-pressure supply system through an electric signal or hydraulically or by establishing a hydraulic connection between the auxiliary-pressure source and the pressure chambers.

BRIEF DESCRIPTION OF THE DRAWINGS

Further features, advantages and possibilities of application of the instant invention can be gathered from the following description of a preferred embodiment with reference to the single FIGURE of the accompanying drawing which, is a schematically simplified view of a system in accordance with this invention that illustrates the important components of a brake system in cross-section.

DETAILED DESCRIPTION OF THE PREFERRED EMBODIMENT

The embodiment illustrated discloses a tandem master cylinder 1 having a vacuum booster 2 connected upstream thereof. This combination is actuatable directly through a push rod 3 connected to a brake pedal 4.

The wheel brakes of a vehicle are diagonally connected to the two brake circuits I and II of the tandem master cylinder 1. The brake circuit 1 leads to the left front wheel VL and the right rear wheel HR, while the brake circuit II leads to the right front wheel VR and the left rear wheel HL.

Inside the master cylinder I, there is a floating piston 5 and a push rod piston 6 which, upon application of the brake pedal 4, boosted by the vacuum booster 2, builds up braking pressure in pressure chambers 7 and 8 also located inside the master cylinder. In the illustrated non-actuated position of the brake system, the pressure chambers 7, 8 communicate via opened central valves 9, 10 with annular chambers 11, 12 and via these with a pressure-fluid compensating and supply reservoir 13.

To regulate the braking pressure when a wheel becomes unstable, that is upon the occurrence of an imminent locked condition, electromagnetically actuatable inlet valve/outlet valve pairs are associated with each brake circuit in the illustrated embodiment. In this embodiment, two-way/two-position directional control valves 14, 15, 16 and 17 are used with the valves 14 and 16 functioning as inlet valves and the valves 15 and 17 functioning as outlet valves. The inlet valves 14 and 16 assume a normally open position, that is, in the event of braking without slip control and in the phase of braking pressure build-up while the outlet valves 15 and 17 are normally closed. Moreover, a two-way/two-position directional control valve 18 is inserted in the pressure fluid conduits of brake circuit I and a similar valve 19 is inserted in the pressure fluid conduits of brake circuit II. These valves 18 and 19 likewise normally allow pressure fluid penetration and are similar to the inlet vlves 14, 16 in respect of design and mode of operation. In specific control periods and/or when certain defect occur, a change-over of these valves 18, 19 prevents a discharge of pressure fluid out of the auxiliary-pressure supply system 20 into the pressure chambers 7, 8 of the master cylinder 1.

The brake system shown is also equipped with an auxiliary-pressure supply system 20 which comprises an electromotively driven pressure-fluid pump 21 and a hydraulic pressure control valve 22. The suction side of the pump communicates via a filter 23 with the reservoir 13. The interior of the pressure control valve 22 houses a spherical seat valve 24 which, as long as pressure is absent from a control chamber 25 also located in the valve 22, after the compression of a weak resetting spring 26 has been overcome, becomes penetrable and opens the pump cycle from the pressure side of this pump to the suction side of this pump and to the reservoir 13. Thus, as long as there is no control pressure, the pressure of the auxiliary-pressure supply system 20 is only allowed to adopt a very low value-after the engine M has been switched on.

The auxiliary-pressure supply system 20 is in communication with the brake circuits I, II via a supply line 27 and non-return valves 28, 29 which uncouple the two brake circuits I, II and which preclude a fluid return flow out of these brake circuits into the auxiliary-pressure supply system 20.

For the sake of clarity of illustration, the accompanying drawing does not display the electric and electronic component parts for measuring the wheel rotational behavior, for the signal processing and for the generation of switching signals for the solenoid valves 14 to 19 and for switching on the drive motor M of the pump 21. This is known in the art and need not be shown for an understanding of this invention.

Operation of the slip-controlled brake system according to this invention will now be explained.

When braking actions without slip control are performed, all solenoid valves 14 to 19 remain in their inactive position shown, that is, valves 14, 16, 18 and 19 are open and valves 15 and 17 are closed. At first, the auxiliary-pressure supply system 20 is not in operation because the electric drive motor M is switched off.

When the (non-illustrated) electronics evaluates the wheel rotational behavior and detects that one or more of the wheels is tending to lock, slip control will commence. By means of the inlet valve/outlet valve pairs 14 to 17, the pressure in the wheel brakes will now be kept constant, decreased and re-increased at the appropriate time in a known fashion. Simultaneously, the drive motor M of the hydraulic pump 21 starts to operate, whereupon the throttle represented by the spherical seat valve 24 serves to develop an auxiliary pressure, which is proportional to the pressure in the pressure chamber 9 which pressure also prevails in the control chamber 25. The auxiliary pressure is made available to the pressure-fluid line 27 and by virtue of change-over of valves 14 to 17—depending on the dimensioning—the auxiliary pressure instead of the master cylinder pressure is supplied to the wheel brakes. A reaction of the pressure fluctuations, caused on actuation of the valves 14 to 17, on the master cylinder 1 and from said on the brake pedal 4 can be prevented. Due to change-over of the valves 18, 19, the two pistons 5 and 6 of the master cylinder 1 are locked in their instantaneous position.

According to the present invention, the auxiliary-pressure supply system 20 is also set into operation independently of the occurrence of a locking tendency and, thus the activation of the slip control. When the stroke of the floating piston 5 exceeds a limit value, such that its control edge 31 displaces the tappet 32 and thereby closes the switch 30, the drive motor M of the pump 21 is switched on by the switch 30, and thus an auxiliary pressure proportional to the pressure in the pressure chamber 8 will develop. By change-over of the valves 18, 19, further advance movement of the pistons 5, 6 will be prevented, and auxiliary pressure instead of the braking pressure generated in the master cylinder 1 is applied through the pressure-fluid line 27 and the non-return valves 28, 29 to the wheel brakes.

Should the auxiliary pressure fail insidiously or suddenly, after the valves 18, 19 have been switched back to their opened position, there will be available in any case a sufficient volume of pressure fluid in the pressure chambers 7 and 8 for more braking actions without slip control.

An additional valve (not shown) can be used so that not only the pressure in the pressure chamber 8, but also the pressure in the chamber 7 is transmitted to the control chamber 25 of the pressure control valve 22 and leads to the build-up of auxiliary pressure in the line 27. Upon failure of the pressure in either of the two chambers 7 or 8, braking would remain possible by means of the braking pressure of both brake circuits. The extended pedal travel and, possibly, an additional warning lamp connected to the control electronics would signal to the driver the failure of one master cylinder circuit. In a like case of disturbance, an alarm signal can also be generated from the pressure-difference switch 33.

What is claimed is:

1. A slip-controlled hydraulic brake system comprising a master cylinder having at least one pressure chamber, wheel brakes connected to the master cylinder and braking pressure control valves between the master cylinder and the wheel brakes, an auxiliary-pressure supply system for introducing fluid pressure to the wheel brakes when it is detected that a wheel is slipping, means for preserving a reserve volume of pressure fluid in the pressure chamber of the master cylinder by introducing pressure fluid out of the auxiliary-pressure supply system when the quantity if pressure fluid drops below a predetermined limit value, said means being operative when the brakes are operative in response to other than detection that a wheel is slipping, further including means for monitoring the piston travel in the master cylinder and for the introduction of pressure fluid out of the auxiliary-pressure supply system when the piston travel attains a predetermined limit value.

2. A brake system as claimed in claim 1, further including means for monitoring the advance movement of a push rod which couples a brake pedal to the master cylinder or to a brake power booster connected upstream thereof and for introducing said pressure fluid out of the auxiliary-pressure supply system upon attainment of a predetermined limit value.

3. A brake system as claimed in claim 1, wherein a brake power booster is connected upstream of the master cylinder, said system further including means for monitoring the booster stroke.

4. A brake system as claimed in claim 1, wherein the master cylinder is a tandem master cylinder, and in that the stroke of the push rod piston and/or of the floating piston associated with the cylinder is monitored.

5. A slip-controlled hydraulic brake system comprising a master cylinder having at least one pressure chamber, wheel brakes connected to the master cylinder and braking pressure control valves between the master cylinder and the wheel brakes, an auxiliary-pressure supply system for introducing fluid pressure to the wheel brakes when it is detected that a wheel is slipping, means for preserving a reserve volume of pressure fluid in the pressure chamber of the master cylinder by introducing pressure fluid out of the auxiliary-pressure supply system when the quantity of pressure fluid drops below a predetermined limit value, said means being operative when the brakes are operative in response to other than detection that a wheel is slipping, further including switches operative to switch on the auxiliary-pressure supply system and/or bring about the introduction of pressure fluid into the pressure chamber or the pressure chambers of the master cylinder when the predetermined limit value is exceeded.

6. A brake system as claimed in claim 5, wherein the travel-responsive switch is actuated by a working piston in the master cylinder.

* * * * *